United States Patent [19]
Covert et al.
[11] Patent Number: 4,714,485
[45] Date of Patent: Dec. 22, 1987

[54] FUEL VAPOR STORAGE CANISTER

[75] Inventors: Charles H. Covert, Manchester; William E. Gifford, Hemlock, both of N.Y.; Craig G. Kemler, De Witt, Mich.; Gordon R. Paddock, Rochester, N.Y.

[73] Assignee: General Motors Corporation, Detroit, Mich.

[21] Appl. No.: 918,886

[22] Filed: Oct. 15, 1986

Related U.S. Application Data

[63] Continuation-in-part of Ser. No. 851,548, Apr. 14, 1986, abandoned.

[51] Int. Cl.[4] .......... B01D 53/04

[52] U.S. Cl. .......... 55/189; 55/385 B; 55/387; 123/519

[58] Field of Search .......... 55/316, 319, 385 B, 55/387, 189; 123/518-521

[56] References Cited

U.S. PATENT DOCUMENTS

| | | | |
|---|---|---|---|
| 3,352,294 | 11/1967 | Biller et al. | 55/387 X |
| 3,393,669 | 7/1968 | Vardi et al. | 55/387 X |
| 3,515,107 | 6/1970 | Joyce | 55/387 X |
| 3,575,152 | 4/1971 | Wentworth | 123/519 |
| 3,618,578 | 11/1971 | Swatman et al. | 123/519 |
| 3,646,731 | 3/1972 | Hansen | 55/316 |
| 3,698,061 | 12/1954 | Jaubert | 55/316 |
| 3,727,597 | 4/1973 | Hensler | 123/519 |
| 3,730,158 | 5/1973 | St. Amand | 55/316 X |
| 3,759,234 | 9/1973 | Buckton et al. | 123/519 |
| 3,854,911 | 12/1974 | Walker | 123/519 X |
| 3,903,858 | 9/1975 | Hecht | 55/319 X |
| 4,058,380 | 11/1977 | King, II | 55/387 |
| 4,203,401 | 5/1980 | Kingsley et al. | 55/387 X |
| 4,280,466 | 7/1981 | Walters | 123/520 |
| 4,318,383 | 3/1982 | Iritani et al. | 123/520 |
| 4,326,489 | 4/1982 | Heitert | 123/519 X |
| 4,430,099 | 2/1984 | Yanagisawa et al. | 55/316 |
| 4,448,594 | 5/1984 | Kozawa | 55/316 X |
| 4,478,619 | 10/1984 | Arends et al. | 55/316 |
| 4,496,379 | 1/1985 | Kozawa | 55/316 X |

FOREIGN PATENT DOCUMENTS

| | | | |
|---|---|---|---|
| 165757 | 12/1981 | Japan | 123/518 |
| 1217347 | 12/1970 | United Kingdom | 123/520 |

*Primary Examiner*—Robert Spitzer
*Attorney, Agent, or Firm*—C. K. Veenstra

[57] ABSTRACT

A canister adapted to store fuel vapor discharged from a fuel tank has an inlet chamber that forms a trap for liquid fuel. Fuel is purged from the canister through a purge tube that has a small liquid purge hole at the bottom of the chamber and a large vapor purge hole spaced above the bottom of the chamber.

2 Claims, 14 Drawing Figures

FUEL VAPOR STORAGE CANISTER

RELATED APPLICATION

This is a continuation-in-part of patent application serial number 851,548 filed Apr. 14, 1986, now abandoned.

TECHNICAL FIELD

This invention relates to control of fuel vapor released from a fuel tank.

SUMMARY OF THE INVENTION

During day to day operation of an automotive vehicle, the temperature of the vehicle fuel tank rises and falls. As the fuel tank temperature rises, some of the fuel vapor in the space above the liquid level is displaced out of the tank. To avoid releasing the fuel vapor to the atmosphere, the existing system vents the vapor to a canister having a bed that adsorbs and stores the fuel vapor.

This invention provides a canister having an inlet chamber that forms a trap for liquid fuel and that has a purge tube with a small liquid purge hole at the bottom of the chamber and a large vapor purge hole spaced above the bottom of the chamber. This canister protects its vapor storage bed against absorption of liquid fuel and thereby preserves the bed for adsorption of fuel vapor.

The details as well as other features and advantages of several embodiments of this invention are set forth in the remainder of the specification and are shown in the drawings.

THE PREFERRED EMBODIMENTS

Figure 1:
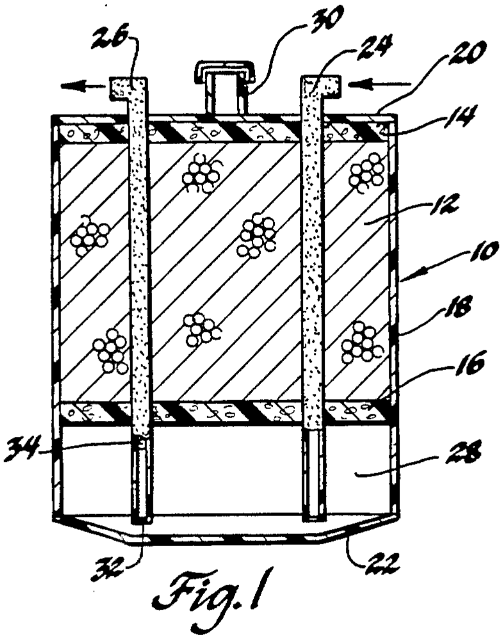
FIG. 1 is a schematic view of a fuel vapor storage canister employing this invention.

Referring first to FIG. 1, a fuel vapor storage canister 10 has a bed 12 of activated carbon adapted to adsorb fuel vapor. Bed 12 is supported between upper and lower foam screens 14 and 16 within a housing 18 closed by a top 20 and a bottom 22.

A fuel vapor inlet tube 24 and a purge tube 26 are supported by top 20, extend through bed 12, and open to an inlet chamber 28 below bed 12. The upper region of canister 10 is open to the atmosphere through an air vent 30. Inlet tube 24 receives a mixture of fuel vapor and air discharged from a fuel tank (not shown). As the mixture passes into chamber 28 and rises through bed 12, the activated carbon in bed 12 adsorbs the fuel vapor and the air flows out through canister vent 30.

Chamber 28 serves as a trap to capture any liquid fuel that may be present in the mixture of fuel vapor and air received through inlet tube 24. By capturing the liquid fuel before it reaches bed 12, bed 12 is protected against absorption of liquid fuel, and the activated carbon is thereby preserved for adsorption of fuel vapor.

Fuel is purged from canister 10 by applying vacuum to purge tube 26. Purge tube 26 has a small liquid purge hole 32 at the lower end and a large vapor purge hole 34 near the top of chamber 28. The vacuum applied through vapor purge hole 34 draws air in through canister vent 30, down through bed 12, and into chamber 28. The air flow through bed 12 desorbs the fuel vapor, and the resulting mixture of air and fuel vapor is drawn out through purge tube 26. The vacuum applied through liquid purge hole 32 gradually purges the liquid fuel from chamber 28, and the liquid fuel is drawn out through purge tube 26 along with the mixture of air and fuel vapor.

Figure 2:
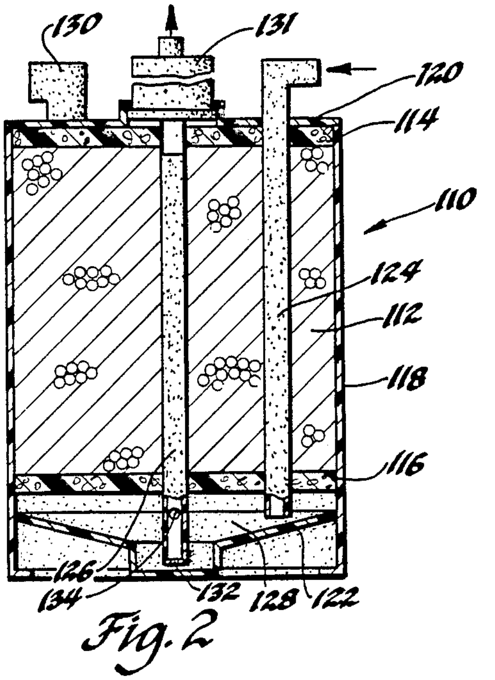
FIG. 2 is a schematic view of a second fuel vapor storage canister employing this invention.
Figure 3:
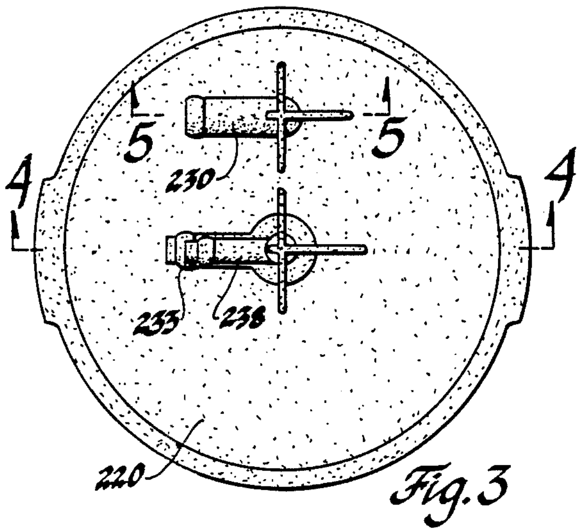
FIG. 3 is a plan view of a third fuel vapor storage canister employing this invention.
Figure 4:
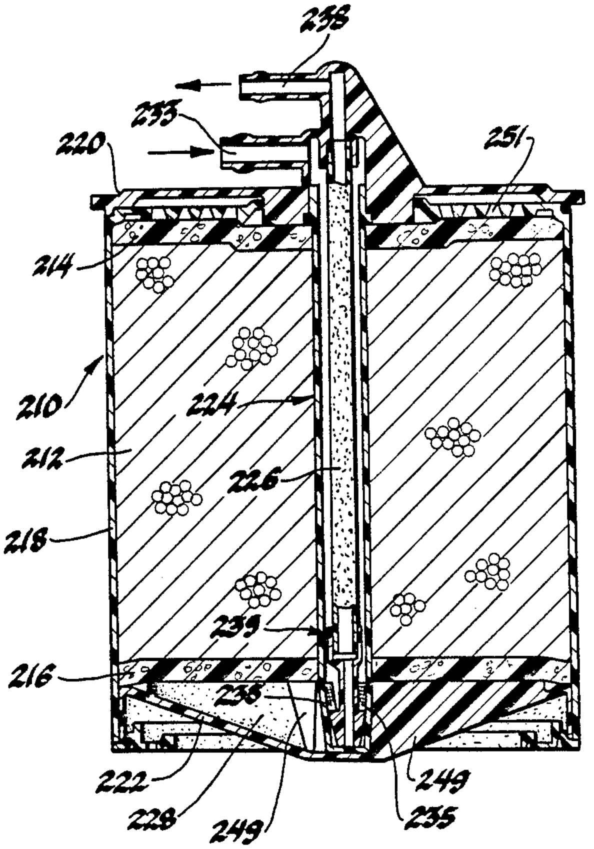
FIG. 4 is a sectional elevational view of the third canister, taken along line 4—4 of FIG. 3.
Figure 5:
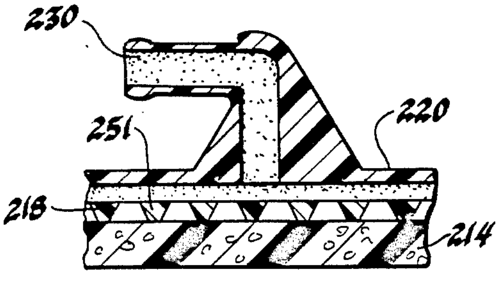
FIG. 5 is an enlarged fragmentary sectional view of the air vent for the third canister, taken along line 5—5 of FIG. 3.
Figure 7:
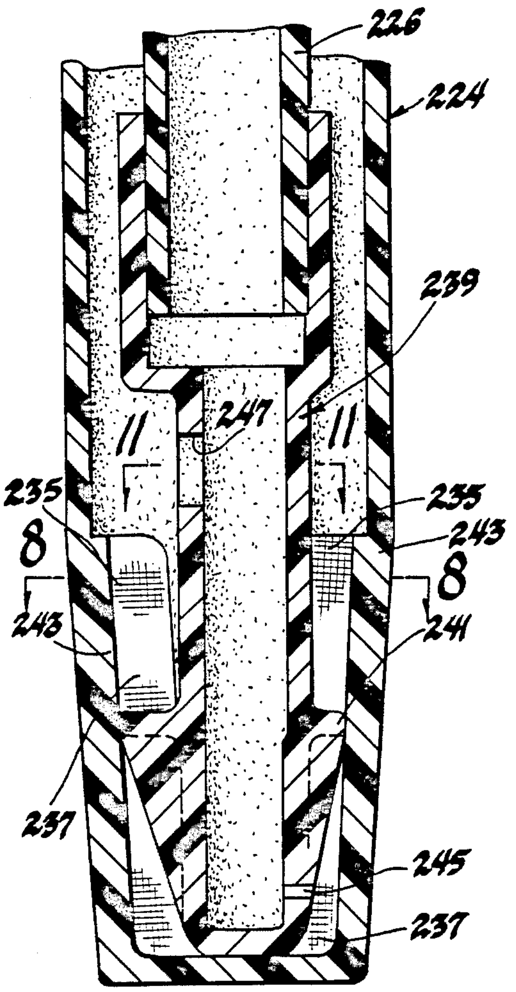
FIG. 7 is an enlarged sectional elevational view of the lower portion of the fuel vapor inlet and purge tubes removed from the third canister.
Figure 6:
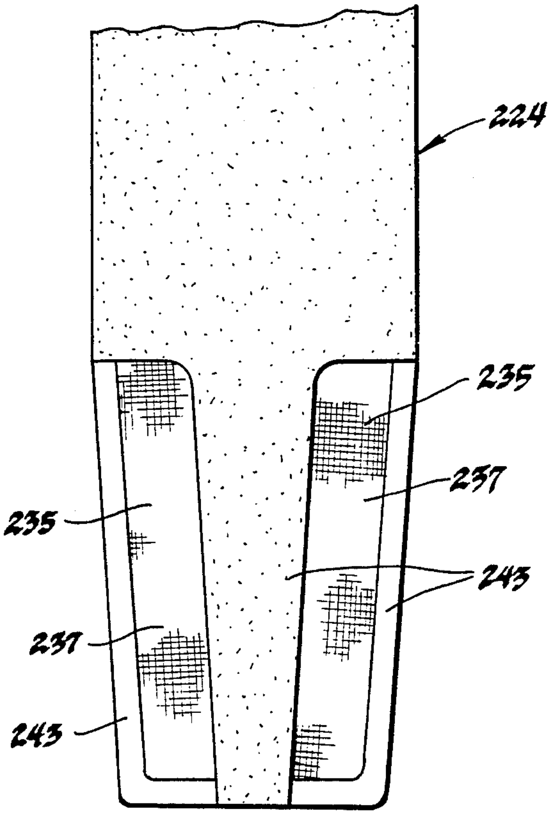
FIG. 6 is an enlarged elevational view of the lower portion of the fuel vapor inlet tube employed in the third canister.
Figure 8:
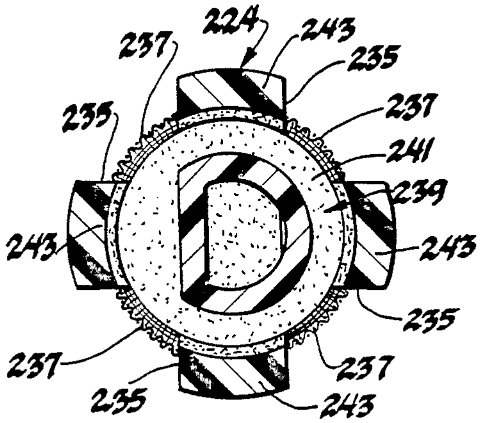
FIG. 8 is an enlarged transverse sectional view of the fuel vapor inlet and purge tubes, taken along the line 8—8 of FIG. 7.
Figure 9:
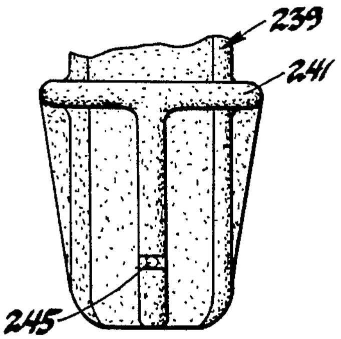
FIG. 9 is an enlarged elevational view of the lower portion of the purge tube.
Figure 10:
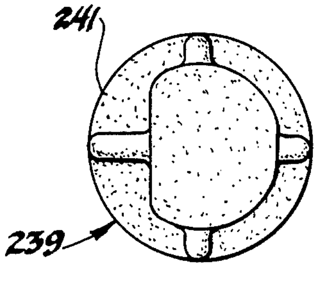
FIG. 10 is an enlarged bottom view of the purge tube.
Figure 11:
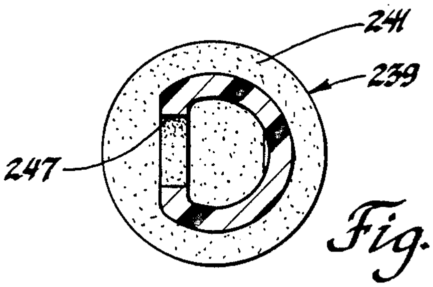
FIG. 11 is an enlarged transverse sectional view of the purge tube, taken along line 11—11 of FIG. 7.

Referring next to FIG. 2, a fuel vapor storage canister 110 has a bed 112 of activated carbon adapted to adsorb fuel vapor. Bed 112 is supported between upper and lower foam screens 114 and 116 within a housing 118 closed by a top 120 and a bottom 122.

A fuel vapor inlet tube 124 and a purge tube 126 are supported by top 120, extend through bed 112, and open to an inlet chamber 128 below bed 112. The upper region of canister 110 is open to the atmosphere through an air vent 130. Inlet tube 124 receives a mixture of fuel vapor and air vented from a fuel tank (not shown). As the mixture passes into chamber 128 and rises through bed 112, the activated carbon in bed 112 adsorbs the fuel vapor and the air flows out through canister vent 130.

Chamber 128 serves as a trap to capture any liquid fuel that may be present in the mixture of fuel vapor and air received through inlet tube 124. By capturing the liquid fuel before it reaches bed 112, bed 112 is protected against absorption of liquid fuel, and the activated carbon is preserved for adsorption of fuel vapor.

Fuel is purged from canister 110 by opening a solenoid operated valve 131 to apply vacuum to purge tube 126. Purge tube 126 has a small liquid purge hole 132 at the lower end and a large vapor purge hole 134 near the top of chamber 128. The vacuum applied through vapor purge hole 134 draws air in through canister vent 130, down through bed 112, and into chamber 128. The air flow through bed 112 desorbs the fuel vapor, and the resulting mixture of air and fuel vapor is drawn out through purge tube 126. The vacuum applied through liquid purge hole 132 gradually purges the liquid fuel from chamber 128, and the liquid fuel is drawn out through purge tube 126 along with the mixture of air and fuel vapor.

Referring now to FIGS. 3–11, a fuel vapor storage canister 210 has a bed 212 of activated carbon adapted to adsorb fuel vapor. Bed 212 is supported between upper and lower foam screens 214 and 216 within a housing 218 closed by a top 220 and a bottom 222.

A fuel vapor inlet tube 224 and a purge tube 226 are supported by top 220, extend through bed 212, and open to an inlet chamber 228 below bed 212. The upper region of canister 210 is open to the atmosphere through an air vent 230. Inlet tube 224 extends from an inlet fitting 233 that receives a mixture of fuel vapor and air discharged from a fuel tank (not shown). Four windows 235 open from inlet tube 224 to chamber 228; each window is covered by a screen 237 formed of monofilament mesh. As the mixture passes through inlet tube 224 and windows 235 into chamber 228 and rises through bed 212, the activated carbon in bed 212 adsorbs the fuel vapor and the air flows out through canister vent 230.

Chamber 228 serves as a trap to capture any liquid fuel that may be present in the mixture of fuel vapor and air received through inlet tube 224. By capturing the liquid fuel before it reaches bed 212, bed 212 is protected against adsorption of liquid fuel, and the activated carbon is thereby preserved for adsorption of fuel vapor.

Purge tube 226 extends from a purge fitting 238 and is disposed within inlet tube 224. Purge tube 226 includes a tip 239 having a flange 241 that engages ribs 243 formed on inlet tube 224 between windows 235; the engagement of flange 241 with ribs 243 provides lateral support for purge tube tip 239.

Fuel is purged from canister 210 by applying vacuum to purge fitting 238 and purge tube 226. Purge tube tip 239 has a small liquid purge hole 245 about 0.44 mm in diameter at the lower end and a large vapor purge hole 247 about 2.79 mm in diameter near the top of chamber 228. The vacuum applied through vapor purge hole 247 draws air through canister vent 230, down through bed 212, and into chamber 228. The air flow through bed 212 desorbs the fuel vapor, and the resulting mixture of air and fuel vapor is drawn out through purge tube 226. The vacuum applied through liquid purge hole 245 gradually purges the liquid fuel from chamber 228, and the liquid fuel is drawn out through purge tube 226 along with the mixture of air and fuel vapor.

The engagement of flange 241 with ribs 243 and screen 237 inhibits liquid fuel adjacent the bottom of purge tube 226 from being drawn within inlet tube 224 to vapor purge hole 247.

The lower end of inlet tube 224 is supported laterally by a plurality of ribs 249 formed on bottom 222 and extending into chamber 228. Ribs 249 also provide support for lower screen 216.

The upper end of housing 218 has a grid 251 spacing upper screen 214 from cover 220 and providing an air chamber between vent 230 and grid 251.

Figure 12:
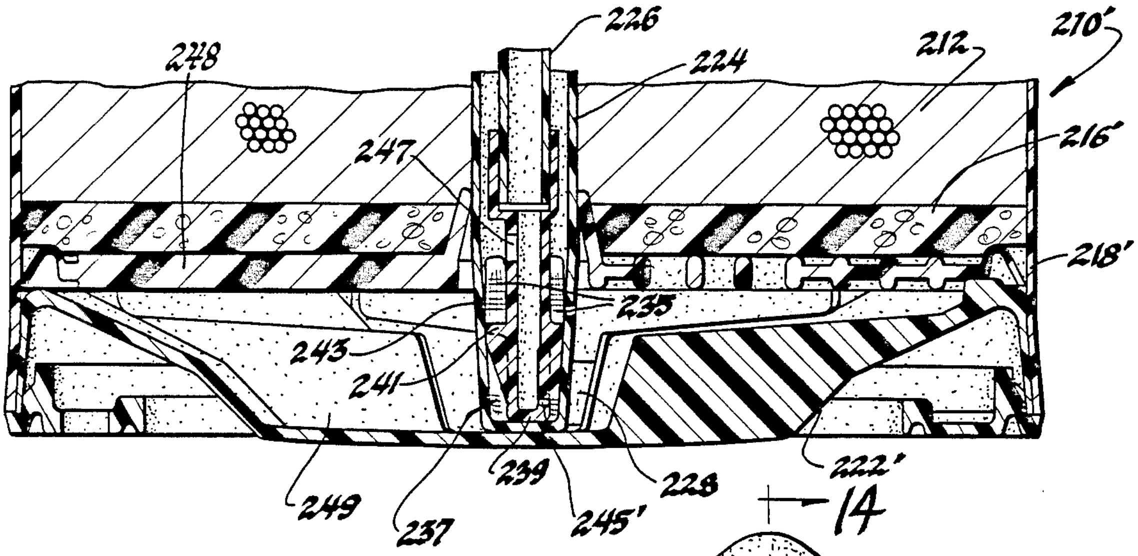
FIG. 12 is a sectional elevational view of the bottom portion of a modification of the third canister.

Referring now to FIG. 12, a fuel vapor storage canister 210' is similar in most respects to canister 210 and includes a bed 212 of activated carbon adapted to adsorb fuel vapor. Bed 212 is supported upon a lower foam screen 216' within a housing 218' closed by a bottom 222'.

Fuel vapor inlet tube 224 and purge tube 226 extend through bed 212 and open to inlet chamber 228 below bed 212. Inlet tube 224 receives a mixture of fuel vapor and air and has four windows 235 opening from inlet tube 224 to chamber 228; each window is covered by a screen 237 formed of monofilament mesh. As the mixture passes through inlet tube 224 and windows 235 into chamber 228 and rises through bed 212, the activated carbon in bed 212 adsorbs the fuel vapor.

Chamber 228 serves as a trap to capture any liquid fuel that may be present in the mixture of fuel vapor and air received through inlet tube 224. By capturing the liquid fuel before it reaches bed 212, bed 212 is protected against absorption of liquid fuel, and the activated carbon is preserved for adsorption of fuel vapor.

Purge tube 226 is disposed within inlet tube 224. Purge tube 226 includes a tip 239 having a flange 241 that engages ribs 243 formed on inlet tube 224 between windows 235.

Fuel is purged from canister 210 by applying vacuum to purge tube 226. Purge tube tip 239 has a small liquid purge hole 245' about 0.5 mm in diameter at the lower end and a large vapor purge hole 247 about 2.79 mm in diameter near the top of chamber 228. The vacuum applied through vapor purge hole 247 draws air down through bed 212 and into chamber 228. The air flow through bed 212 desorbs the fuel vapor, and the resulting mixture of air and fuel vapor is drawn out through purge tube 226. The vacuum applied through liquid purge hole 245' gradually purges the liquid fuel from chamber 228, and the liquid fuel is drawn out through purge tube 226 along with the mixture of air and fuel vapor.

The lower end of inlet tube 224 is supported laterally by an intermediate grid 248 disposed above ribs 249 formed on bottom 222'. Grid 248 also provides support for lower screen 216'.

Figure 13:
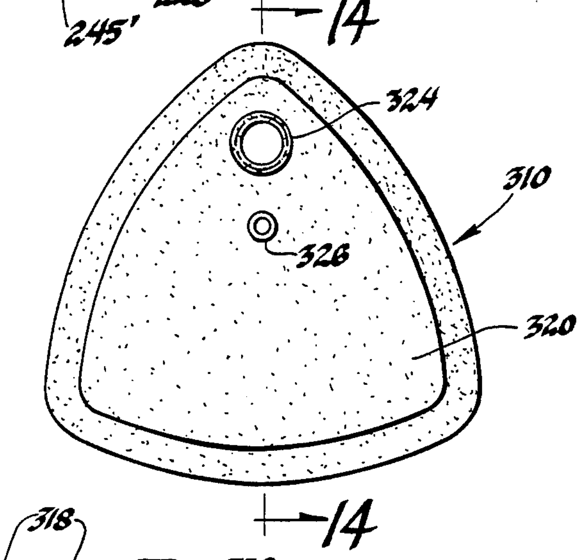
FIG. 13 is an end elevational view of another fuel vapor storage canister employing this invention.
Figure 14:
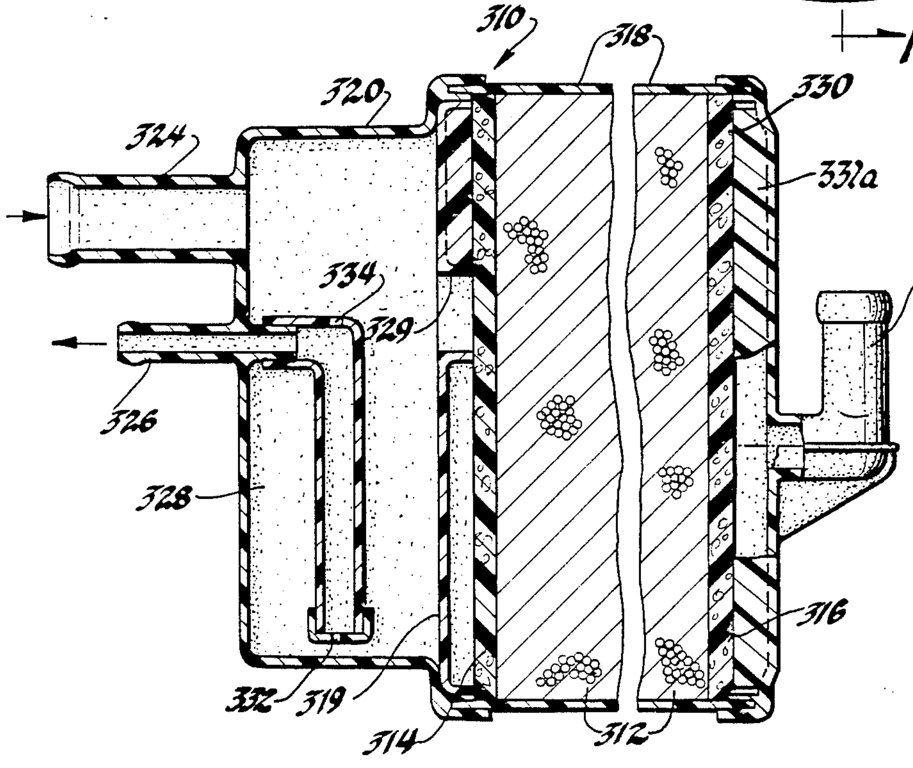
FIG. 14 is an enlarged sectional view of the FIG. 13 canister, taken along line 14—14 of FIG. 13.

Referring to FIGS. 13–14, a fuel vapor storage canister 310 with a horizontal axis has a bed 312 of activated carbon adapted to adsorb fuel vapor. Bed 312 is supported between foam screens 314 and 316 within a housing 318.

At the left end of canister 310, as viewed in FIG. 14, housing 318 is closed by a partition 319 and a cover 320. A fuel vapor inlet tube 324 and a purge tube 326 are formed as part of cover 320 and open into an inlet chamber 328 between cover 320 and partition 319. Chamber 328 opens to bed 312 through an aperture 329 in partition 319, aperture 329 being spaced substantially above the bottom of chamber 328.

The region 330 at the right end of canister 310 is open to the atmosphere through the vent tube 331 of a cover **331*a***.

Inlet tube 324 receives a mixture of fuel vapor and air discharged from a fuel tank (not shown). As the mixture flows through chamber 328, aperture 329 and bed 312, the activated carbon in bed 312 adsorbs the fuel vapor and the air flows out through the region 330 advent tube 331.

Chamber 328 serves as a trap to capture any liquid fuel that may be present in the mixture of fuel vapor and air received through inlet tube 324. By capturing the liquid fuel before it reaches bed 312, bed 312 is protected against absorption of liquid fuel, and the activated carbon is preserved for adsorption of fuel vapor.

Fuel is purged from canister 310 by applying vacuum to purge tube 326. Purge tube 326 has a small liquid purge hole 332 about 0.020 in (0.5 mm) in diameter at the lower end and a large vapor purge hole 334 about 0.110 in (2.79 mm) in diameter near the top. The vacuum applied through vapor purge hole 334 draws air in through the vent tube 331 and region 330, through bed 312, and into chamber 328. The air flow through bed 312 desorbs the fuel vapor, and the resulting mixture of air and fuel vapor is drawn out through purge tube 326. The vacuum applied through liquid purge hole 332 gradually purges the liquid fuel from chamber 328, and the liquid fuel is drawn out through purge tube 326 along with the mixture of air and fuel vapor.

Canister 310 also employs the invention set forth in U.S. patent application Ser. No. 851,847 filed Apr. 14, 1986 in the names of J. Fornuto, W. E. Gifford and K. M. Meyer, now abandoned, and patent application Ser. No. 918,887 filed Oct. 10, 1986 in the names of J. Fornuto, W. E. Gifford and K. M. meyer.

Canisters 210 and 210' also employ the invention set forth in patent application Ser. No. 080,502 filed July 31, 1987 in the names of F. J. Rediker and R. G. Van Vechten.

The embodiments of the invention in which an exclusive property or privilege is claimed are defined as follows:

1. A fuel vapor storage canister comprising a housing having an inlet chamber, a region vented to the atmosphere, and a bed of material adapted to adsorb fuel vapor disposed between said chamber and said region, a fuel vapor inlet tube opening to said chamber whereby fuel vapor may be introduced to said canister and flow from said chamber into said bed and said bed may adsorb said fuel vapor, and a purge tube opening to said chamber whereby vacuum applied to said purge tube may cause air to flow from said region through said bed to said chamber and whereby said air flow may desorb fuel vapor from said bed, and wherein said purge tube has a liquid purge hole disposed near the bottom of said chamber and a vapor purge hole spaced substantially above the bottom of said chamber, whereby said chamber serves as a trap for liquid fuel introduced through said inlet tube, and whereby said liquid fuel is purged from said chamber along with said air flow and desorbed fuel vapor.

2. A fuel vapor storage canister comprising a housing having an inlet chamber, a region vented to the atmosphere, and a bed of material adapted to adsorb fuel vapor disposed between said chamber and said region, said inlet chamber and bed and region being aligned along a vertical axis with said inlet chamber at the bottom, a fuel vapor inlet tube opening to said chamber whereby fuel vapor may be introduced to said canister and flow from said chamber into said bed and said bed may adsorb said fuel vapor, and a purge tube disposed concentrically within said inlet tube and opening to said chamber whereby vacuum applied to said purge tube may cause air to flow from said region through said bed to said chamber and whereby said air flow may desorb fuel vapor from said bed, and wherein said purge tube has a liquid purge hole disposed near the bottom of said chamber and a vapor purge hole spaced substantially above the bottom of said chamber, whereby said chamber serves as a trap for liquid fuel introduced through said inlet tube, and whereby said liquid fuel is purged from said chamber along with said air flow and desorbed fuel vapor.

* * * * *